(12) United States Patent
Morrill et al.

(10) Patent No.: US 8,295,215 B2
(45) Date of Patent: Oct. 23, 2012

(54) UNIVERSAL FEMTO CELL

(75) Inventors: Robert J. Morrill, Overland Park, KS (US); Carl Milton Coppage, Kansas City, MO (US)

(73) Assignee: CenturyLink Intellectual Property LLC, Denver, CO (US)

(*) Notice: Subject to any disclaimer, the term of this patent is extended or adjusted under 35 U.S.C. 154(b) by 1085 days.

(21) Appl. No.: 11/897,980

(22) Filed: Aug. 31, 2007

(65) Prior Publication Data

US 2009/0059822 A1    Mar. 5, 2009

(51) Int. Cl.
*H04B 7/00* (2006.01)

(52) U.S. Cl. ......... 370/310; 370/324; 370/350; 370/503

(58) Field of Classification Search ............... 455/552.1, 455/422.1, 447, 267, 443, 266, 450, 442; 370/310, 328, 315, 344, 342, 312, 412
See application file for complete search history.

(56) References Cited

U.S. PATENT DOCUMENTS

| | | | | |
|---|---|---|---|---|
| 2003/0018484 A1* | 1/2003 | Franks et al. | | 705/1 |
| 2004/0203890 A1* | 10/2004 | Karaoguz et al. | | 455/456.1 |
| 2005/0083899 A1* | 4/2005 | Babbar et al. | | 370/342 |
| 2007/0097938 A1* | 5/2007 | Nylander et al. | | 370/338 |
| 2007/0110043 A1* | 5/2007 | Girard | | 370/352 |
| 2007/0219960 A1* | 9/2007 | Vadon et al. | | 707/3 |
| 2009/0047955 A1* | 2/2009 | Frenger et al. | | 455/436 |

* cited by examiner

*Primary Examiner* — Hassan Phillips
*Assistant Examiner* — Anez Ebrahim
(74) *Attorney, Agent, or Firm* — Patton Boggs LLP (57) ABSTRACT

A universal femto cell, method, and computer usable program product for using the universal femto cell are provided such that the femto cell is configurable according to the user's choice of wireless carriers. A user configurable component of the universal femto cell enables a user to configure the universal femto cell to operate on at least one wireless communication network. The universal femto cell further includes a storage unit for storing information used in configuring the universal femto cell, a network communication component used in communicating with a network, and a user interface component to receive a user input. The universal femto cell receives a second input from a data processing system, and uses the user input and the second input to configure the universal femto cell to operate on one or more wireless communication network.

24 Claims, 4 Drawing Sheets

| Wireless carrier 502 | Wireless carrier's URL for femto cell configuration 504 | Wireless carrier's technical support website 506 | Wireless carrier's phone number 508 |
|---|---|---|---|
| Alltel | FC_Configuration_Server.alltel.com | www.FC_HELP.alltel.com | 800.xxx.xxxx |
| Sprint | FC_Configuration_Server.Sprint.com | www.FC_HELP.Sprint.com | 800.xxx.xxxx |
| Verizon | FC_Configuration_Server.Verizon.com | www.FC_HELP.verizon.com | 800.xxx.xxxx |
| xyz Company | FC_Configuration_Server.xyzCompany.com | www.FC_HELP.xyzCompany.com | 800.xxx.xxxx |
| ... | ... | ... | ... |
| ... | ... | ... | ... |

UNIVERSAL FEMTO CELL

BACKGROUND

1. Field of the Invention

The principles of the present invention relate generally to an improved telecommunications system, and in particular, to an improved configuration of a telecommunications system for wireless communications. Still more particularly, the principles of the present invention relate to a universal femto cell, and method and computer usable program product for using a universal femto cell.

2. Description of the Related Art

Wireless communication, such as with a wireless phone, use a network of antenna towers. An antenna tower is a radio frequency antenna mounted on a tower, or other mounting structure, such as a side of a building. A wireless communication device is a device that enables a user to establish a wireless communication for voice, video, or data. The wireless communication device communicates with the antenna tower for establishing the wireless communication. A cellular phone is an example of a wireless communication device.

An antenna tower sends and receives wireless signals to and from a wireless communication device to facilitate wireless communication. The antenna tower includes equipment called Base Transceiver Station equipment (BTB). A BTS is radio equipment that uses the antenna tower for facilitating radio communication with wireless communication devices. The BTS communicates with other equipment on a wireless carrier's network to connect those wireless communications devices with other devices.

A wireless communication device has to be in proximity of an antenna tower to use the wireless communication services of a wireless carrier. Power of the BTS and the design of the wireless network determines the distance from the antenna tower at which a wireless communication device can be expected to work in an intended manner. The lower the power of a BTS, the smaller the distance from the antenna tower will be within which wireless communication can be established using that antenna tower.

A wireless carrier plans the locations of antenna towers such that radio communications between wireless communication devices and the BTS of the antenna tower, or coverage, is possible in an intended region. The plan of the locations of the antenna towers in a region is called a cell design. The area within a coverage region that is covered by a particular antenna tower is called a cell. Generally, the cell design is intended to provide coverage at all locations within each cell. However, as consumers of wireless services are familiar, areas within a cell called dead zones can experience limited or no coverage, resulting in failed or interrupted wireless communication, or wireless communication of less than desirable quality.

As a solution to these problems, wireless carriers configure smaller cells within a cell's dead zone. Wireless carriers install equipment called a pico cell or a femto cell (hereinafter, collectively referred to as "femto cell"), which is a radio communications device that improves the coverage into the dead zones. A femto cell includes the functionality of a BTS, an antenna tower, and certain other equipment in the wireless communication network A femto cell is provided, and the femto cell's location is determined, by a specific wireless carrier so that the particular femto cell may operate on the wireless carrier's wireless communication network Femto cells are different from wireless LAN technologies such as IEEE 802.11a/b/g/n in that femto cells operate using the same frequency and protocols as the macro wireless carrier. Often these frequencies are licensed by the government and are protected by law from unauthorized use. In addition, femto cells participate in the wireless carriers coverage plans, including identifying other nearby towers, adjusting their transmit power requirements accordingly, and performing inter-tower call hand-off.

SUMMARY

To enable a user to configure a femto cell according to the user's choice of locations and the user's choice of wireless carriers, the illustrative embodiments provide a universal femto cell, method, and computer usable program product for using the universal femto cell. In one embodiment, a universal femto cell includes a radio transceiver for communicating with a wireless communication device, a user configurable component to enable a user to configure the universal femto cell to operate on at least one wireless communication network The universal femto cell further includes a storage unit for storing information used in configuring the universal femto cell, a network communication component used in communicating with a network and a user interface component to receive a first input from the user. Using either the radio transceiver or the network communication component, the universal femto cell receives a second input from a data processing system. The user configurable component in the universal femto cell uses the first and the second inputs to configure the universal femto cell to operate on one or more wireless communication network The first input from the user and other user inputs may be received, from a web page presented by a web server in the user interface component of the universal femto cell. The second input maybe from a master configuration server providing a carrier configuration list and other optional instructions. Using the first and second inputs may include requesting and receiving instructions from a carrier configuration server for configuring the universal femto cell, and other additional instructions. The master configuration server and the carrier configuration server may be one and the same, or distinct data processing systems. A carrier configuration server may authenticate the user, the universal femto cell, or both, before providing the instructions for configuring the universal femto cell.

BRIEF DESCRIPTION OF THE DRAWINGS

The novel features believed characteristic of the illustrative embodiments are set forth in the appended claims. The illustrative embodiments, however, as well as a preferred mode of use, will best be understood by reference to the following detailed description of an illustrative embodiment when read in conjunction with the accompanying drawings, wherein:

DETAILED DESCRIPTION OF THE DRAWINGS

Presently, a wireless carrier provides a femto cell that operates on the wireless carrier's own wireless communication network Frequently, a wireless carrier also determines the type of femto cell equipment and the femto cell's location of installation. Therefore, illustrative embodiments recognize that a user of a wireless carrier's services is presently dependent on the wireless carrier to select, provide, configure, and operate a femto cell. The illustrative embodiments further recognize that in circumstances where a user uses multiple wireless carriers' services, the user's dependencies described above increase with the number of wireless carriers.

In order to solve these and other problems with wireless carrier provided femto cells, the illustrative embodiments describe a universal femto cell, method and computer usable program product for using the universal femto cell. A universal femto cell is a femto cell that is configurable to operate on any wireless communication network that supports femto cells. A user can procure, configure and operate the universal femto cell of the illustrative embodiments according to the user's preferences. For example, a user may be able to buy a universal femto cell from a retailer, and configure the universal femto cell to improve coverage in a dead zone inside the user's home. Particular implementations of the illustrative embodiments can also enable a user to configure a universal femto cell to operate on multiple wireless communication networks.

The universal femto cell of the illustrative embodiments is capable of functioning as an antenna tower, a BTS, a networking device, other equipment used in a wireless communication network or any combination thereof. A networking device is a modem, adapter, router, or a switch commonly used for connecting a data processing system to a network such as the Internet. Examples of a networking device include but are not limited to telephone modems, cable modems, digital subscriber line (DSL) modems, and other broadband modems.

Other equipment used in a wireless communication network includes but is not limited to Base Station Controller (BSC), which communicates with one or more BTS as described below. A particular implementation of the illustrative embodiments may include the functionality of a wireless communication device within the described universal femto cell.

Figure 1:
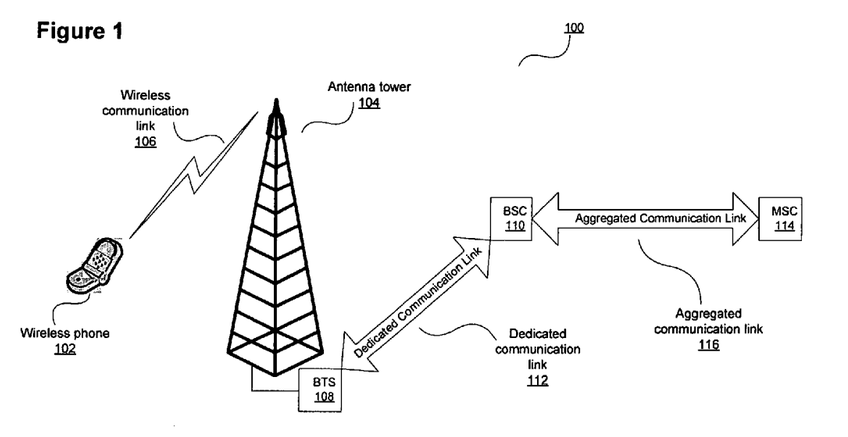
FIG. 1 depicts an illustration of a presently used wireless communication network in which the illustrative embodiments may be implemented.

With reference to the figures, and in particular with reference to FIG. 1, exemplary diagrams of data processing environments are provided in which illustrative embodiments may be implemented. FIG. 1 is not intended to assert or imply any limitation with regard to the environments in which different embodiments maybe implemented. Many modifications to the depicted environments maybe made.

FIG. 1 depicts an illustration of a presently used wireless communication network in which the illustrative embodiments may be implemented. Wireless communication network 100 is a schematic configuration of a wireless communication network presently in use for wireless communications. Wireless phone 102 is an exemplary wireless communication device. Wireless phone 102 communicates with antenna tower 104 using wireless communication link 106. BTS 108 is the BTS equipment that uses antenna tower 104 for providing wireless communication services to wireless phone 102.

BTS 108 communicates with BSC 110 using dedicated communication link 112. A BSC is equipment in a wireless communication network that is responsible for handling traffic and signaling between a wireless communication device and the network switching subsystem of the wireless carrier. A dedicated communication link is a section of the wireless communication network providing connectivity between one or more BTSs and one or more BSCs in the wireless carrier's network BSC 110 communicates with Mobile Switching Center (MSC) 114 using aggregated communication link 116. MSC is one or more pieces of equipment in a wireless communication network that carries out switching functions and manages the communications between wireless communication devices and the Public Switched Telephone Network (PSTN). PSTN is the traditional telephone network An aggregated communication link is a section of the wireless communication network providing connectivity between one or more BSCs and one or more MSCs. Aggregated communication link 116 may include a public network such as the Internet.

Figure 2:
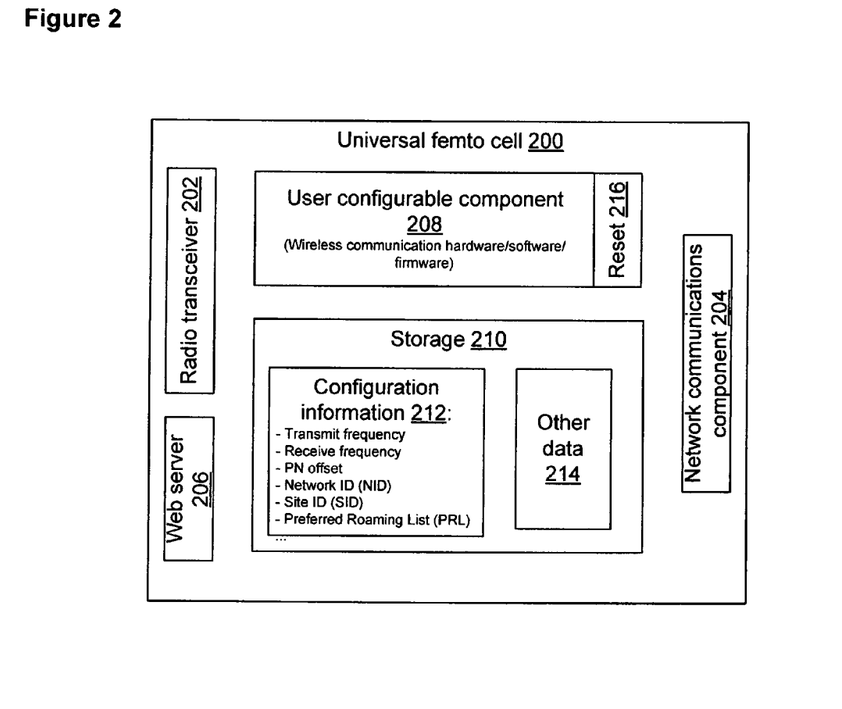
FIG. 2 depicts a block diagram of a universal femto cell in accordance with an illustrative embodiment.

With reference to FIG. 2, this figure depicts a block diagram of a universal femto cell in accordance with an illustrative embodiment. Universal femto cell 200 may be used for improving coverage in dead zones in wireless communication network 100 in FIG. 1.

Universal femto cell 200 includes radio transceiver 202 for communicating with wireless communication devices Network communications component 204 communicates with a data network such as a local area network (LAN) Ethernet network that may connect to the Internet over a broadband network Web server 206 is an exemplary component for facilitating a user's interactions with universal femto cell 200. Using web server 206, universal femto cell 200 may display information to a user and accept information from the user, as described with respect to FIG. 4, below. Other methods of interacting with the user may substitute for web server 206. For example, a set of lights and buttons, a built in liquid crystal display (LCD) with buttons or touch-screen, or other methods for input/output of information maybe used in place of web server 206.

Universal femto cell 200 includes user configurable component 208, which includes wireless communication hardware/software/firmware. As different from wireless communication hardware/software/firmware in existing wireless carrier provided femto cells, user configurable component 208 is configurable by a user to operate on one or more wireless communication networks that support femto cells.

Universal femto cell 200 further includes storage 210, which stores configuration information 212 and other data 214 as maybe needed. Storage 210 maybe a readable writable data storage medium such as memory, hard disk, or other suitable storage media. Furthermore, configuration information 212 may reside in storage 210 or in a different location or removable media, such as a compact disc or a flash storage card.

Configuration information 212 may include information for suitably operating universal femto cell 200 on a wireless communication network of the user's choice. For example, configuration information 212 may include network and wireless technology specific configurations, such as a specification for transmit frequency for radio transmission to a wireless communication device, a specification for receive frequency for receiving the radio transmission from the wireless communication device, and specifications for specific wireless technology such as code division multiple access (CDMA), Global System for Mobile communications/ Groupe Special Mobile (GSM), or other wireless technology.

Configuration information 212 may further include a Pseudo Noise offset (PN offset). PN offsets are analogous to television channel numbers, and each sector of each cell site has a different offset. PN offsets can change but are unique within a cell site. Even though PN offsets are unique, they are usually repeated at great enough distances that a signal from a cell site with a certain PN offset is not confused with a signal from another site far away.

Configuration information 212 may further include a network identifier (network ID), and a site identifier (site ID). The specific items of information contained in configuration information 212 and described above are only exemplary and not intended to be limiting on the illustrative embodiment. These items have been selected for the clarity of the description of the illustrative embodiment. A specific implementation of the illustrative embodiment may add, modify, remove, substitute, or combine these and other items of information that maybe useful in configuring universal femto cell 200.

Furthermore, a specific implementation of the illustrative embodiment may include additional components in universal femto cell 200. For example, network communications component 204 may include a broadband modem to connect to a broadband data network As another example, universal femto cell 200 may include a Global Positioning System (GPS) receiver to assist universal femto cell 200 in maintaining synchronization with other towers within the wireless network. Many other augmentations and combinations are conceivable from the illustrative embodiments in this disclosure.

In one embodiment, geographical location of a universal femto cell, such as a GPS location, may be a consideration in allowing the universal femto cell to operate. Location based authenticating maybe particularly meaningful in preventing cases where a user may want to operate the universal femto cell in an unauthorized manner. For example, a user may take a universal femto cell to a location where the user's subscribed wireless carrier does not have licensed spectrum. Configuring the universal femto cell to operate using the user's subscribed wireless carrier's configuration in such a location may violate licensing and tariff agreements. If the universal femto cell is in a location where a specific carrier configuration is not authorized to operate, the universal femto cell may not operate.

Additionally, a reset mechanism may also be provided in universal femto cell 200 for resetting the configuration. Reset 216 is a reset mechanism and maybe implemented in a variety of ways. For example, reset 216 maybe a hardware reset button, software instructions available via the user interface, or other ways of instructing universal femto cell 200 to reset the configuration. Generally, reset 216 may be included to reset the universal femto cell to a default configuration. One default configuration may be the state of the universal femto cell when the universal femto cell is not configured to operate on any particular wireless network. Other default configurations, such as configuring to operate on one particular wireless network may also be implemented. Resetting to a default configuration allows a user to reconfigure the universal femto cell, such as for operating on a new wireless carrier, selling the universal femto cell to another user, or reconfiguring the universal femto cell in case of a corrupted configuration. An implementation of universal femto cell of the illustrative embodiments may maintain the configuration such that a power outage may not erase or reset the configuration.

Figure 3:
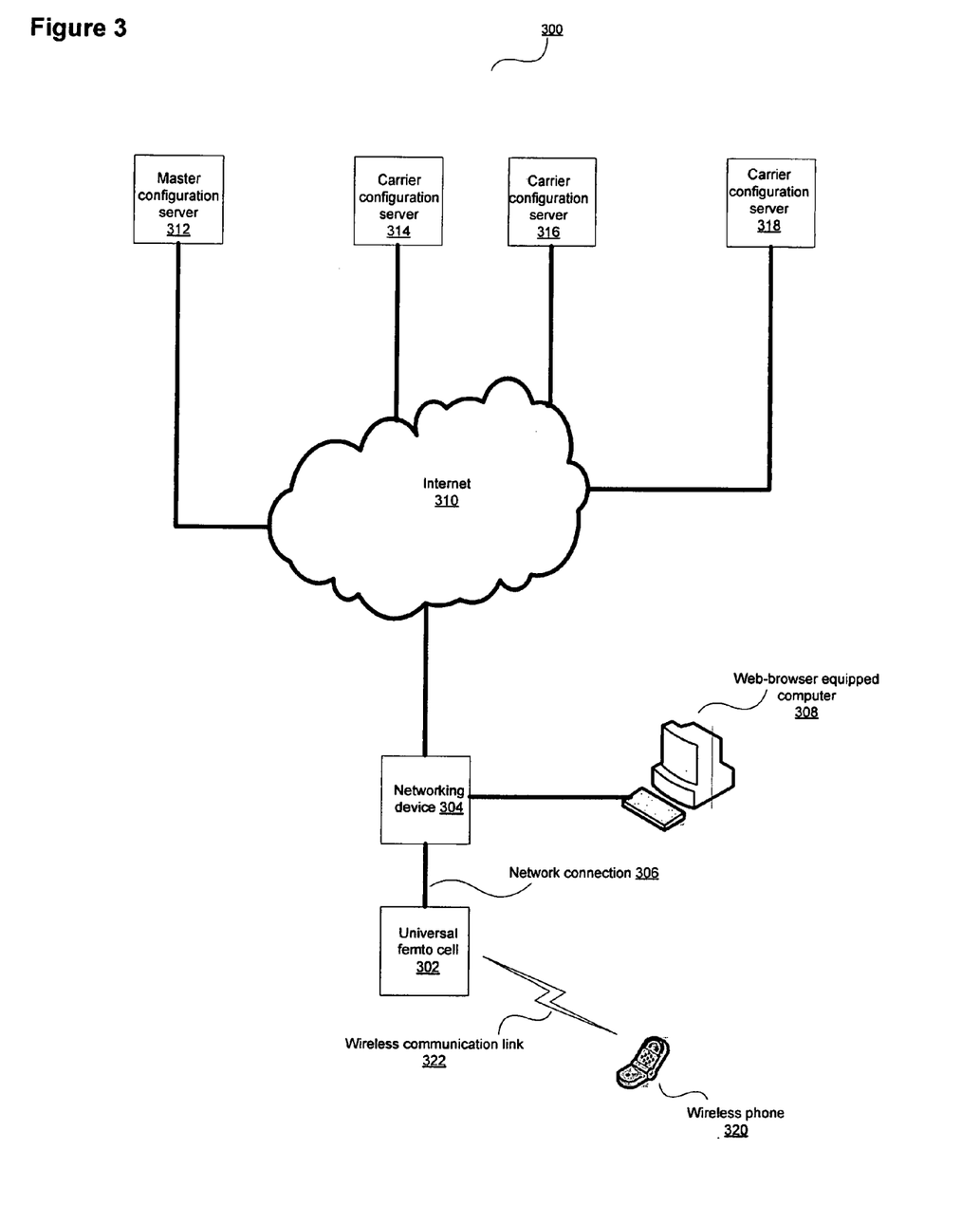
FIG. 3 depicts a block diagram of an improved wireless communication network using universal femto cell in accordance with an illustrative embodiment.

With reference to FIG. 3, this figure depicts a block diagram of an improved wireless communication network using universal femto cell in accordance with an illustrative embodiment. improved wireless communication network 300 may be implemented using wireless communication network 100 in FIG. 1 in conjunction with universal femto cell 200 in FIG. 2.

Universal femto cell 302 is in communication with networking device 304 using network connection 306. Networking device 304 is a networking device as described above. Network connection 306 maybe a local area network (LAN) connection over Ethernet, Wi-Fi, Wi-Max, or any other suitable type of communication channel including a connection to a wide area network (WAN such as to an Internet service provider's (ISP) network Furthermore, as described above, universal femto cell 302 and networking device 304 may be combined together in an implementation of the illustrative embodiments.

Other data processing systems may also be in communication with networking device 304. Web-browser equipped computer 308 is an example of such a data processing system that may be in communication with networking device 304 using Ethernet, Wi-Fi, Wi-Max, or other network connections.

Figure 5:
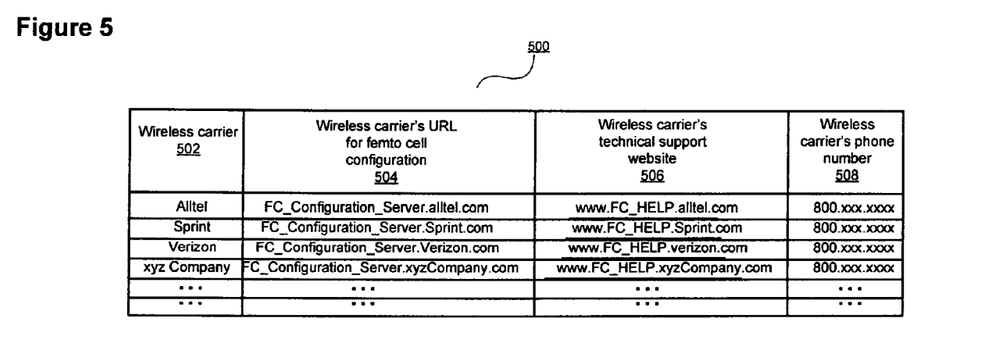
FIG. 5 depicts an exemplary carrier configuration list maintained by a master configuration server in accordance with an illustrative embodiment.

Networking device 304 provides connectivity to Internet 310. Master configuration server 312 is a data processing system capable of communicating with universal femto cells over Internet. Master configuration server 312 maintains a carrier configuration list. A carrier configuration list is information about where to find carrier configuration information corresponding to one or more wireless carriers that support femto cells on their wireless communication networks. Carrier configuration information is information specific to a wireless carrier that has to be used for operating a device on the wireless carrier's wireless communication network. For example, master configuration server 312 may maintain names, IP addresses for femto cell configuration information, and other information, such as femto cell specific help pages and wireless carrier specific help pages, in the carrier configuration list. FIG. 5 shows an exemplary carrier configuration list.

Carrier configuration servers 314, 316, and 318 are data processing systems capable of communicating with universal femto cells over the Internet. Each carrier configuration server, such as carrier configuration server 314, is operated by a specific wireless carrier or carrier partner as in the case of Mobile Virtual Network Operators (MVNO) and/or Business Affiliates, and maintains information about configuring a universal femto cell to operate on that wireless carrier's wireless communication network. Once configured, wireless communication devices, such as wireless phone 320, may establish wireless communications using wireless communication link 322 with universal femto cell 302.

Figure 4:
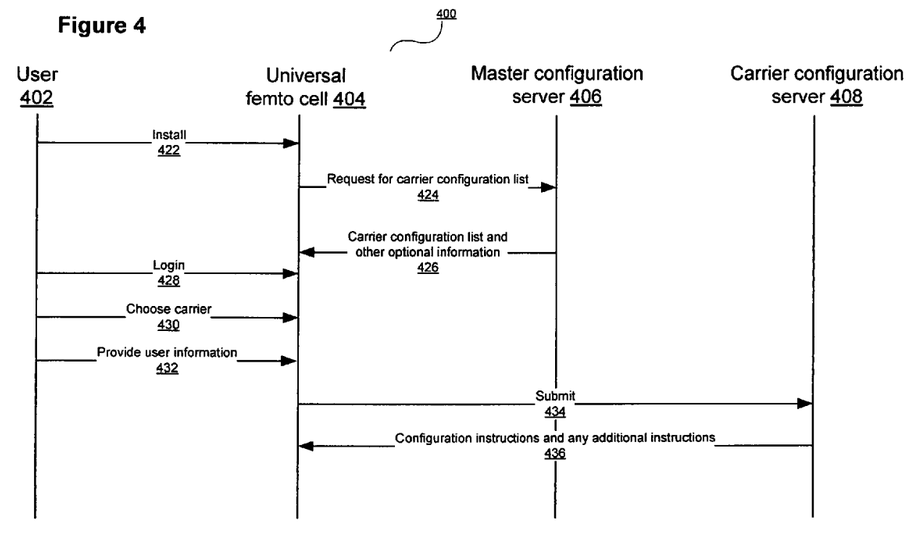
FIG. 4 depicts a timing diagram of an exemplary operation of an improved wireless communication network in accordance with an illustrative embodiment.

With reference to FIG. 4, this figure depicts a timing diagram of an exemplary operation of an improved wireless communication network in accordance with an illustrative embodiment. Timing diagram 400 may represent the operation of improved wireless communication network 300 in FIG. 3.

User 402 may be a user of a wireless carrier's services, and may be the individual installing universal femto cell 404. Universal femto cell 404 maybe implemented using universal femto cell 304. Master configuration server 406 maybe implemented using master configuration server 312. Carrier configuration server 408 maybe implemented using any of carrier configuration servers 314-318.

Install 422 is the installation of universal femto cell 404 by user 402. For example, with reference back to FIG. 3, installation occurs when universal femto cell 302 is in communication with networking device 304. During installation, networking device 304 may provide universal femto cell 302 a data communication path to Internet 310, such as by assigning an IP address to universal femto cell 302.

A universal femto cell being freshly configured may contain information to communicate with a master configuration server. For example, a newly purchased universal femto cell may have the IP address of a specific master configuration server stored in the universal femto cell such that upon gaining access to Internet, the universal femto cell may communicate with that specific master configuration server. Alternatively, the universal femto cell may contain a domain name and a domain name server's address instead of an IP address. Using the domain name server at the domain name server address, the universal femto cell may resolve the domain name to an IP address, thus avoiding having to store a fixed IP address in the universal femto cell. If universal femto cell 404 contains similar information, universal femto cell 404 may communicate with master configuration server 406 and send a request for carrier configuration list 424.

Master configuration server 406 may respond to universal femto cell 404 with a carrier configuration list that it maintains, and any other additional information, in carrier configuration list and other optional information 426. Other optional information may include information such as contact information for wireless carriers' technical support department.

Universal femto cell 404 may present user 402 a user interface, such as a web page served by web server 206 in FIG. 2. Using the user interface, user 402 may perform login 428, which allows universal femto cell 404 to provide information to user 402 and accept information from user 402. For example, universal femto cell 404 may provide user 402 the carrier configuration list received from master configuration server 406. User 402 may chose carrier 430 by choosing one or more carriers from the carrier configuration list. User 402 may further provide user information 432, such as the user's account number, equipment serial number (ESN) of the user's wireless communication device, and other information for configuration.

Using the information in the carrier configuration list received from master configuration server 406, and inputs received from user 402, universal femto cell 404 performs submit 434 to carrier configuration server 408. Carrier configuration server 408 provides configuration instructions and any additional instructions 436 to universal femto cell 404. Additional instructions may include instructions for testing the configuration once universal femto cell 404 has been configured according to the configuration instructions. Other examples of additional instructions 436 may include instructions for diagnostic functions, corrective functions, post-configuration functions, and informative functions.

Above operations are only exemplary and have been selected for clarity of the description of the illustrative embodiment. Other operations in addition to or in lieu of those described above are conceivable from this disclosure. Furthermore, the operations described above maybe performed in a different order without departing from the scope and spirit of the illustrative embodiment. For example, a particular implementation of the universal femto cell may display informational messages to the user while communicating with the carrier configuration server. As another example, if an error in encountered during any of the operational steps, the universal femto cell may display error messages or suggestions to the user, or perform corrective operations, which are not shown, before proceeding with a described operation.

With reference to FIG. 5, this figure depicts an exemplary carrier configuration list maintained by a master configuration server in accordance with an illustrative embodiment. List 500 may be maintained by master configuration server 312 in FIG. 3.

In the exemplary carrier configuration list depicted as list 500, column 502 entitled "Wireless carrier" records the identity of the various wireless carriers that support femto cells and universal femto cells on their wireless communication network Column 504 entitled "wireless carrier's URL for femto cell configuration" contains the website uniform resource locator (URL), or link where a universal femto cell may find the wireless carrier's configuration parameters for femto cells and universal femto cells.

Column 506 entitled "Wireless carrier's technical support website" and column 508 entitled "Wireless carrier's phone number" are examples of other information that a master configuration server may provide to a universal femto cell in a carrier configuration list. Entries in column 506 and 508 may provide information that a universal femto cell may display to a user, should the user need help in configuring the universal femto cell. A particular implementation of the illustrative embodiments may include other or different information not shown in list 500.

Figure 6:
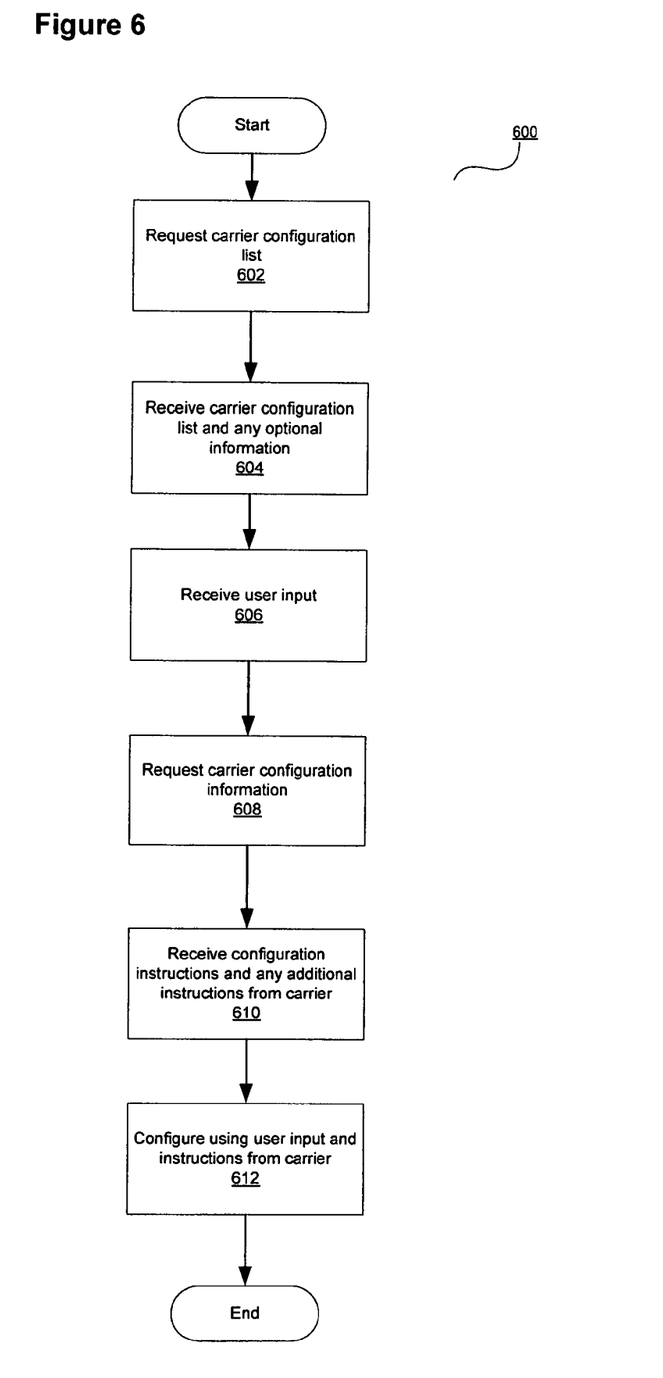
FIG. 6 depicts a process of configuring a universal femto cell in accordance with an illustrative embodiment.

With reference to FIG. 6, this figure depicts a process of configuring a universal femto cell in accordance with an illustrative embodiment. Process 600 maybe implemented using universal femto cell 200 in FIG. 2. The process begins by requesting a carrier configuration list (step 602). As described above, information used for making this request may already be stored in the universal femto cell, such as in flash memory or other suitable type of storage. Furthermore, process 600 may make this request automatically, such as upon gaining connectivity to a LAN or WAN, or upon receiving a user input.

In response to the request of step 602, process 600 receives carrier configuration list and any optional information (step 604). In one embodiment, a universal femto cell may already include a carrier configuration list, and the process may omit steps 602 and 604.

The process also receives user input, such as information about a user's account with a specific wireless carrier, (step 606). Based on the information received in steps 604 and 606, the process requests carrier configuration information from a particular wireless carrier for configuring the universal femto cell on that wireless carrier's wireless communication network (step 608).

In response to the request of step 608, the process receives configuration instructions and any additional instructions from the wireless carrier (step 610). Based on the instructions received in step 610, the process configures the universal femto cell to operate on the wireless carrier's wireless communication network (step 612). The process ends thereafter.

Note that the steps of process 600 are arranged and described only as exemplary and are not intended to be limiting on the illustrative embodiment. Some steps may be omitted, combined, further broken down, re-arranged, re-ordered, re-formed, or modified for particular implementations without departing from the scope and spirit of the illustrative embodiments. For example, step 606 may be performed before 602 within the scope of the illustrative embodiments. As another example, step 604 may be partitioned into multiple steps for receiving the carrier configuration list and optional information separately. As another example, steps 608 and 610 maybe implemented as one request and one response, or several requests and responses. For example, a carrier may return only the carrier configuration instructions first, and then send additional responses containing additional instructions, such as instructions for diagnostic functions, corrective functions, post-configuration functions, and informative functions.

Thus, the illustrative embodiments describe a universal femto cell method, and computer usable program product for using the universal femto cell. The universal femto cell and the corresponding method are described such that a user may configure the universal femto cell to operate with a wireless carrier of the user's choice. Furthermore, a universal femto cell according to the illustrative embodiments may be procured by a user independent of any pre-configuration by a wireless carrier, configure or re-configure the universal femto cell according to the user's preferences for operating on one or more wireless carrier's wireless communication networks.

A wireless carrier maybe able to expand the coverage of its wireless communication network through the deployment of the universal femto cells of the illustrative embodiments. Such expansion of coverage may be at a smaller expense to the wireless carrier when compared to the expense of expanding coverage using wireless carrier supplied femto cells or antenna towers. As wireless technologies evolve, the commonalities in the various wireless standards and operating parameters may make universal femto cells a preferred method of expanding coverage and giving the users more flexibility in consuming wireless communication services.

What is claimed:

1. A universal femto cell comprising:
a radio transceiver for communicating with a wireless communication device;
a user configurable component in communication with the radio transceiver and configured to enable a user to configure the universal femto cell to operate on any one of a plurality of wireless carrier communication networks; a storage unit for storing information used in configuring the universal femto cell; a network communication component for connecting the universal femto cell to a network; and
a user interface component in communication with the storage unit and configured to receive a first input from the user, wherein one of the radio transceiver and the network communication component automatically receives a carrier configuration list that includes information about a set of wireless carriers from a network server in response to the universal femto cellular connecting to the network, and wherein the first input and the carrier configuration list are used by the user configurable component to configure the universal femto cell to operate on a user selected wireless communication network, wherein the user interface component is further configured to receive a second user input that includes user account information associated with the user selected wireless carrier;
wherein the carrier configuration list includes: a carrier configuration information of the user selected wireless carrier selected from the set of wireless carriers, the carrier configuration information including first instructions to configure the universal femto cell to operate on a wireless communication network operated by the user selected wireless carrier; wherein the carrier configuration information is provided responsive to a request for carrier configuration information, wherein the request includes authenticating information sufficient to authenticate one or more of the user and the universal femto cell, and the wireless carrier accepts the authenticating information.

2. The universal femto cell of claim 1, wherein the carrier configuration list is received from a first network server and the carrier configuration information is received from a second network server.

3. The universal femto cell of claim 1, wherein the carrier configuration information includes: additional instructions usable for one or more of diagnostic functions, corrective functions, post-configuration functions, and informative functions, and wherein the additional instructions are received one of together with and separate from the carrier configuration information.

4. The universal femto cell of claim 1, wherein information used by the universal femto cell for communicating with the network server to receive the carrier configuration list is preconfigured in the universal femto cell prior to sell.

5. The universal femto cell of claim 1, wherein the user interface component is a web server, wherein the web server presents a web page on a web-browser equipped network server, and wherein the user uses the web page to provide the first input.

6. The universal femto cell of claim 1, wherein the network communication component is capable of connecting to at least one of a local area network and a wide area network.

7. The universal femto cell of claim 1, further comprising:
a reset mechanism, wherein the reset mechanism instructs the universal femto cell to use a default configuration.

8. A method for using a universal femto cell, the method comprising:
receiving a carrier configuration list that includes information about a set of wireless carriers from a network server in response to the universal femto cellular connecting to a network; receiving a first input from a user; and
configuring, using the first input and the carrier configuration list, a user configurable component of the universal femto cell to operate the universal femto cell on any one of a user selected wireless communication network among a plurality of wireless carrier communication networks; and receiving a second user input that includes user account information associated with the user selected wireless carrier;
wherein receiving the carrier configuration list further includes: receiving career configuration information of a wireless carrier selected from the set of wireless carriers, the carrier configuration information including first instructions to configure the universal femto cell to operate on the user selected wireless communication network operated by the wireless carrier; wherein the carrier configuration information is received responsive to a request for carrier configuration information, wherein the request includes authenticating information sufficient to authenticate one or more of the user and the universal femto cell, anti the wireless carrier accepts the authenticating information.

9. The method of claim 8, wherein the carrier configuration list is received from a first network server and the carrier configuration information is received from a second network, server.

10. The method of claim 8, further comprising: receiving additional instructions, wherein the additional instructions are usable for one or more of diagnostic functions, corrective functions, post-configuration functions, and in formative functions.

11. The method of claim 8, wherein information used for receiving the carrier configuration list is preconfigured in the universal femto cellular prior to sell.

12. The method of claim 8, wherein the user interface component is a web server, wherein the web server presents a web page on a web-browser equipped network server, and wherein the user uses the web page to provide the first input.

13. The method of claim 8, wherein the network communication component of the universal femto cell is capable of connecting to at least one of a local area network and a wide area network.

14. The method of claim 8, further comprising:
storing information used in configuring the universal femto cell in a storage unit.

15. The method of claim 8, further comprising:
resetting the universal femto cell to a default configuration.

16. A computer usable program product in a non-transitory computer readable medium storing computer executable instructions for using a universal femto cell that, when executed, cause the universal femto cell to:
receive a first input from the user using a user interface component; receive a carrier configuration list from a network server using one of a radio transceiver of the femto cell a network communication component of the femto cell; configure, using the first and the carrier configuration list, a user configurable component of the universal femto cell to operate the universal femto cell on any one of a user selected wireless communication network among a plurality of wireless carrier communication networks; and receive a second user input that includes user account information associated with the user selected wireless carrier;
wherein the instructions causing the universal femto cell to receive the carrier configuration list further include instructions that, when executed cause the universal femto cell to: receive a carrier configuration information of a wireless carrier selected from the set of wireless carriers, the carrier configuration information including first instructions to configure the universal femto cell to operate on the user selected wireless communication network operated by the wireless carrier; wherein the carrier configuration information is received responsive to a request for carrier configuration information, wherein the request includes authenticating information sufficient to authenticate one or more of the user and the universal femto cell, and the wireless carrier accepts the authenticating information.

17. The computer usable program product of claim 16, wherein the carrier configuration list is received from a first network server and the carrier configuration information is received from a second network server.

18. The computer usable program product of claim 16, further comprising instructions to: receive additional instructions, wherein the additional instructions are usable for one or more of diagnostic functions, corrective functions, post-configuration functions, and informative functions.

19. The computer usable program product of claim 16, wherein information used for receiving the carrier configuration list is preconfigured in the universal femto cell.

20. The computer usable program product of claim 16, wherein the user interface component is a web server, wherein the web server presents a web page on a web-browser equipped network server, and wherein the user uses the web page to provide the first input.

21. The computer usable program product of claim 16, wherein the network communication component of the universal femto cell is capable of connecting to at least one of a local area network and a wide area network.

22. The computer usable program product of claim 16, further comprising instructions to:
store information used in configuring the universal femto cell in a storage unit.

23. The computer usable program product of claim 16, further comprising instructions to:
reset the universal femto cell to a default configuration.

24. The computer usable program product of claim 16, further comprising instructions to: reset the universal femto cell to a default configuration.

\* \* \* \* \*